United States Patent
DiNoia et al.

[15] 3,686,708
[45] Aug. 29, 1972

[54] HYDRAULIC CUSHIONING DEVICE

[72] Inventors: Emanuel J. DiNoia, Briar Cliff Manor; Henry B. Klatte, Yonkers, both of N.Y.; Theodore R. Breunich, Stanford, Conn.

[73] Assignee: Universal Oil Products Company, Des Plaines, Ill.

[22] Filed: Oct. 5, 1970

[21] Appl. No.: 77,999

[52] U.S. Cl. ..................16/51, 188/298, 188/322, 267/64
[51] Int. Cl. .................................................E05f 3/04
[58] Field of Search ........267/64; 188/316, 298, 322; 16/51, 54, 52

[56] References Cited

UNITED STATES PATENTS

| | | |
|---|---|---|
| 3,456,282 | 7/1969 | Eastin............................16/52 |
| 1,785,339 | 12/1930 | Daland....................267/64 X |
| 2,688,150 | 9/1954 | Roussel..........................16/52 |
| 3,161,908 | 12/1964 | Walach...........................16/52 |
| 3,173,671 | 3/1965 | Broadwell................267/64 R |
| 3,222,049 | 12/1965 | Tuczek........................267/64 |
| 3,237,931 | 3/1966 | Cousin........................267/64 |
| 3,391,922 | 7/1968 | Aythammer.............267/64 R |
| 3,410,549 | 11/1968 | Cheak .........................267/64 |

FOREIGN PATENTS OR APPLICATIONS 1,122,780  9/1960  Germany....................267/64

Primary Examiner—Martin P. Schwadron
Assistant Examiner—Leslie J. Payne
Attorney—James R. Hoatson, Jr. and Philip T. Liggett

[57] ABSTRACT

A unidirectionally operative hydraulic damping device. A piston attached to a piston shaft is reciprocally moved within a cylinder having a blind end and an open end with the piston shaft extending out through the open end. A flexible diaphragm is hermetically sealed to the piston or the piston shaft at or near the junction therebetween. The flexible diaphragm is also circumferentially hermetically sealed to the cylinder wall at the open end of the cylinder. A cushion valve means is located at the piston, thereby allowing free movement of the piston in one direction relative to the cylinder but restricting movement in the opposite direction. Hydraulic fluid is confined between the blind end of the cylinder and the flexible diaphragm is varying proportions on either side of the piston, depending upon the position of the piston in the cylinder.

3 Claims, 2 Drawing Figures

PATENTED AUG 29 1972 3,686,708

INVENTORS:
Emanuel J. DiNoia
Theodore R. Breunich
Henry B. Klatte

BY:
*James R. Hudson*
*Philip T. Liggett*
ATTORNEYS

HYDRAULIC CUSHIONING DEVICE

This invention relates to a unidirectionally operative hydraulic damping device. A piston attached to a piston shaft is reciprocally movable within a cylinder having a blind end and an open end with the piston shaft extending out through the open end. A flexible diaphragm is hermetically sealed to the piston or the piston shaft at or near the junction therebetween. The flexible diaphragm is also circumferentially hermetically sealed to the cylinder wall at the open end of the cylinder. A cushion valve means is located at the piston, thereby allowing free movement of the piston in one direction relative to the cylinder but restricting movement in the opposite direction. Hydraulic fluid is confined between the blind end of the cylinder and the flexible diaphragm in varying proportions on either side of the piston, depending upon the position of the piston in the cylinder. The diaphragm expands and contracts to maintain a constant total volume of the cavities on the two sides of the piston.

In conventional cushioning devices, the piston shaft slides past a transverse seal fixed across the open end of the cylinder as the piston reciprocates. There is thereby less total space in the cavities in the cylinder when the piston is near the blind end than when it is near the open end of the cylinder due to the space within the cylinder occupied by the piston shaft. In the present invention, as hydraulic fluid flows past the piston toward the blind end of the cylinder as the piston moves toward the open end of the cylinder, the diaphragm expands around the piston shaft toward the cylinder walls so that sufficient hydraulic fluid may be withdrawn from the cavity bounded by the piston and the diaphragm. When the piston moves in the opposite direction so that hydraulic fluid flows into the cavity bounded by the diaphragm and the piston, the diaphragm collapses inward about the piston shaft to accommodate all of the hydraulic fluid expelled from the cavity bounded by the blind end of the cylinder and the piston.

One primary use of the hydraulic cushioning device of this invention is as a cushioning means in a hinge for a door that opens by upward rotation about a horizontal axis or any axis having a horizontal component. The hydraulic cushioning device used in this way prevents the door from slamming shut due to the force of gravity. The hydraulic cushioning device of this invention is equally as useful in other applications, such as a shock absorber in a vehicle seat, particularly a tractor seat or a truck seat. It is also useful in a seat back adjusting mechanism to replace a conventional hydraulic cylinder used to adjust the back angle of a surface transportation seat or an airplane seat.

It is an object of this invention to provide a hydraulic cushioning device that has a constant cushioning force throughout a stroke of the piston using an incompressible hydraulic fluid. The cushioning force is different as the piston moves in each opposite direction, but is constant throughout the stroke in each separate direction. The term incompressible, as used herein, includes all liquids, since liquids have a very low compressibility when compared with most gases.

It is another object of this invention to obviate the need for a seal through which the piston shaft slides. Conventional seals about a piston shaft are prone to leak, especially if oil is used as a hydraulic fluid. Conventional seals thereby result in fluid stains on articles and stored materials located adjacent thereto and present an unsightly appearance and vary the cushioning characteristics of the hydraulic cushioning device.

When combined with a door hinge for an upward opening door, the hydraulic cushioning device of this invention prevents the door from swinging rapidly downward when it is released from a generally lateral position. The damping device cushions the downward rotation of the door about the axis of rotation at a constant rate, but does not noticeably restrict the upward rotation of the door member when the door is to be closed. This feature renders predictable the downward rotational speed of the door and facilitates manipulation of the door member.

In a broad aspect, this invention is a unidirectionally operative hydraulic damping device comprising a cylinder having a blind end and an open end, a piston assembly comprising a piston reciprocally movable relative to and within said cylinder and a piston shaft fastened to said piston and extending out of said open end of said cylinder, a flexible diaphragm sealed to said piston assembly in the vicinity of said piston shaft and circumferentially sealed to the said open end of said cylinder, hydraulic fluid confined in said cylinder between said blind end of said cylinder and said diaphragm, and a cushion valve means located at said piston and allowing free movement of said piston in one direction relative to said cylinder and restricting movement of said piston in the opposite direction relative to said cylinder.

The hydraulic cushioning device of this invention is more fully illustrated in the accompanying drawings in which.

Figures 1, 2:
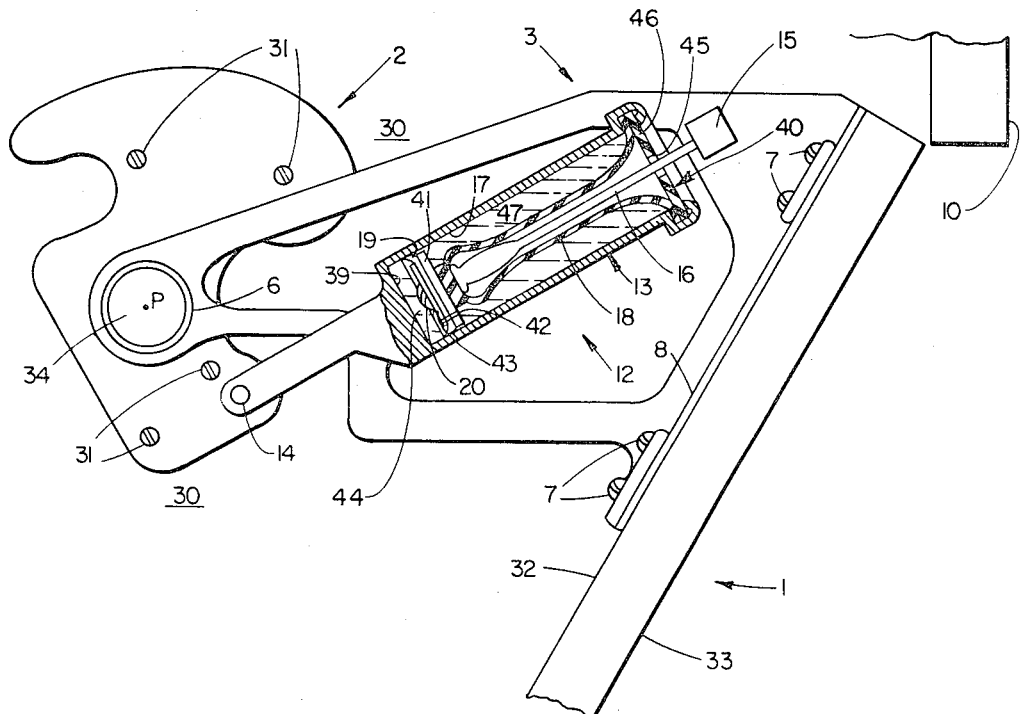
FIG. 1 is an elevational view in partial section of a hinge for a door utilizing the hydraulic cushioning device of this invention.
FIG. 2 is an isolated view of the hydraulic cushioning device of this invention with the piston near the open end of the cylinder.

Referring now to FIG. 1, there is shown a door hinge for rotating a door member 1 with respect to a door frame about an axis of rotation P perpendicular to the plane of FIG. 1. An anchor means 2 is fastened flat up against a frame member 30 which comprises a portion of the door frame of this invention. The frame member 30 also forms an interior side panel of an enclosure. A frame member 10 extends downward above and in front of the door member 1 and in an abutting relationship with the frame member 30. The door 1 is illustrated in the closed position so that the door 1 blocks the slanted opening of the enclosure or compartment extending to the left in FIG. 1. The exterior face of the door member 1 is indicated at 33 while the interior face is indicated at 32.

The anchor means 2 is fastened to frame member 30 by means of screws 31. A swivel link means 3 is attached to the interior surface 32 of door member 1 by means of screws 7 extending through holes in a mounting plate 8. Together, the anchor means 2 and the swivel link means 3 comprise two relatively rotatable members connected to each other at an axis P. The rotation means connecting the anchor means 2 to the swivel link means 3 is comprised of a sleeve-like portion 6 of swivel link means 3 extending perpendicular to the plane of FIG. 1 and surrounding a central shaft 34 that protrudes out perpendicular from anchor means 2. Swivel link means 3 thereby rotates relative to anchor means 2. The movement of swivel link means 3 is facilitated by the provision of a lubricating fluid working between the shaft 34 and the sleeve 6.

The door hinge illustrated is further comprised of the hydraulic damping means 12 of this invention interposed between the anchor means 2 and the swivel link means 3. The hydraulic damping means 12 is comprised of a cylinder 13 having a blind end 39 and an open end 40. The hydraulic damping means 12 also has a piston assembly comprised of a piston 41 reciprocally movable relative to and within the cylinder 13 and a piston shaft 16 fastened to the piston 41. The cylinder 13 is attached to the anchor means 2 by a pivot pin 14. The piston 41 and the piston shaft 16 are attached to the swivel link means 3 by a fastening block 15. Alternatively, the cylinder 13 could be attached to the swivel link means 3 and the piston 41 and piston rod 16 could be attached to the anchor means 2.

The hydraulic damping means 12 is further comprised of hydraulic fluid confined in the cavities 44 and 47 and a cushion valve located at the piston 41 in cylinder 13. The cushion valve has a flexible gasket 19 with an annular rim protruding toward the blind end 39 of the cylinder 13. A rigid metal washer 43 stabilizes the central portion of the gasket 19 and screw 20 fastens washer 43 and the gasket 19 to the piston 41. A passageway 42 extends through the washer 43, the gasket 19, and the piston 41, thereby providing an avenue of fluid communication between the two cavities of the cylinder 13 on either side of the piston 41. Passageway 42 is sized small enough so that it accommodates only a small fluid flow. A quantity of hydraulic fluid is trapped between the cylinder 13 and the diaphragm 18 in both the cavity 44 adjacent to the blind end of the cylinder and in cavity 47 which is bounded by the piston 41 and the flexible diaphragm 18.

The cushion valve is located at the piston 41 in the cylinder 13 and allows an easy movement of the piston 41 toward the open end 40 of the cylinder 13 while restricting movement of the piston 41 toward the blind end 39 of cylinder 13. As the door member rotates upward and counterclockwise about the axis of rotation P, as illustrated in FIG. 2, hydraulic fluid flows into the cavity 44 of cylinder 13 bounded by the piston 41 and the blind end 39 of cylinder 13. The hydraulic fluid flows through the passageway 42 and also between the annular rim of gasket 19 and the walls 17 of cylinder 13. The hydraulic damping means 12 thereby presents practically no opposition to upward movement of the door member 1. As the door member 1 is rotated upward and the piston shaft 16 is withdrawn from the cylinder 13, hydraulic fluid passes to cavity 44 from the cavity 47. The flexible diaphragm 18 expands outward against the walls 17 of cylinder 13 in order to occupy the space vacated by he hydraulic fluid. As the piston 41 moves toward the open end 40, the flexible diaphragm 18 is doubled back upon itself in folds that are pressed outward against the walls 17 as illustrated in FIG. 2. When the door member 1 is rotated back downward toward the position of FIG. 1, the hydraulic cushioning means 12 allows only a slow clockwise rotation of door member 1. Downward movement of the door member 1 is restricted since the rim of gasket 19 flares out and forms a seal against the wall 17 of the cylinder 13 as illustrated in FIG. 1. This restricts fluid flow in that the only flow path is through the passageway 42.

To obviate the problem of fluid leakage at a seal around a moving piston shaft, the flexible diaphragm 18 of the hydraulic cushioning device 12 is sealed to the piston assembly in the vicinity of piston 41, either to the piston shaft 16 near the piston 41 or to the piston 41 near the shaft 16. Flexible diaphragm 18 is also circumferentially sealed to the cylinder 13 at the open end 40 of cylinder 13. The open end 40 may be considered to be any portion of the cylinder 13 which encircles the piston shaft 16 at all times during reciprocation of the piston 41.

Besides obviating the requirement for a fluid tight seal at aperture 45 in closure disk 46, the use of flexible diaphragm 18 in the hydraulic cushioning device 12 has another advantage. In many conventional hydraulic cushioning devices not utilizing a separate reservoir of flexible volume and utilizing a virtually incompressible hydraulic fluid, the cushioning action is uneven as the piston is forced into the cylinder. This variation in cushioning in a hydraulic cushioning device of rigid dimensions occurs because of the area occupied by the piston shaft. That is, as the piston travels through a cylinder, the piston and piston shaft displace a certain amount of hydraulic fluid. If this fluid flows past the piston from the blind end of the cylinder into that portion of the cylinder containing the piston shaft, there is less volume available between the piston and the sealed open end of the cylinder which the hydraulic fluid may occupy. This decrease in volume is equal to the volume occupied by the piston shaft over the length of the piston displacement. Pressure is built up in the cylinder in the cavity through which the piston shaft extends, and further longitudinal displacement of the piston toward the blind end of the cylinder is resisted. The same effect holds true when the piston is withdrawn, since there is more volume available at the blind end of the cylinder than there is hydraulic fluid displaced from adjacent the piston shaft. The result of this conventional construction is a hydraulic cushioning device in which the damping is much larger when the damping device is in the compressed state and when it is in the expanded state than when it is in an intermediate state, since the hydraulic fluid is normally nearly incompressible. The resultant pressure buildup is a primary cause of leakage at the seal around the piston shaft.

In the present invention, flexible diaphragm 18 moves radially inward toward the piston shaft 16 as in FIG. 1 when the piston 41 moves toward the blind end 39 of cylinder 13. This radially inward movement provides additional space to accommodate the excess hydraulic fluid displaced from the cavity 44 as the cavity 44 diminishes in volume. Conversely, when the piston 41 is withdrawn toward the open end 40 of cylinder 13, as in FIG. 2, the flexible diaphragm 18 expands radially outward from the piston shaft 16 toward the walls 17 of the cylinder 13. This allows additional hydraulic fluid to be made available from cavity 47 in order to fill cavity 44. Due to the adjustable volume of the hydraulic cushioning device 12, hydraulic damping is relatively constant throughout each stroke of the piston 41. That is, the minimal damping force opposing upward movement of the door member 1 is relatively constant as the piston 41 moves from the position of FIG. 1 to the position of FIG. 2. Since the cushioning valve of the hydraulic cushioning device allows fluid to flow freely past the annular lip of the gasket 19, the damping force is quite small as the piston moves from the position of FIG. 1 to that of FIG. 2. The damping force increases significantly when the door member 1 rotates from an open position clockwise downward about the axis P to the closed position of FIG. 1. During this movement, the piston 41 moves from the position of FIG. 2 to the position of FIG. 1. Since the flexible diaphragm 18 compensates for the volume change in the cylinder, however, this downward movement is resisted by a relatively constant force as governed by the resistance to fluid flow through the passageway 42. Cushioning of the door member, therefore, occurs at a uniform rate.

The foregoing detailed description and illustrations of the hydraulic cushioning device of this invention have been given for clearness of understanding only, and no unnecessary limitations should be construed therefrom as other modifications will be obvious to those skilled in the art. For example, the hydraulic cushioning device could be disposed between a seat member and a base member of a vehicle seat or between a fixed frame member and an upper portion of a movable back member of a reclining seat back.

We claim as our invention:

1. A unidirectionally cushioned hinge for a member biased by gravity to a normally closed position comprising two relatively rotatable members connected to each other at an axis, a cylinder having a blind end and an open end and connected to one of said relatively rotatable members, a piston assembly comprising a piston reciprocally movable relative to and within said cylinder and a piston shaft fastened to said piston and extending out of said open end of said cylinder and connected to the other of said relatively rotatable members, a flexible diaphragm sealed to said piston assembly in the vicinity of said piston and circumferentially sealed to said open end of said cylinder, said flexible diaphragm folding back on itself as said piston is moved toward the open end of said cylinder, hydraulic fluid confined in said cylinder between said blind end of said cylinder and said diaphragm, and a cushion valve means located at said piston and allowing substantially free movement of said piston in one direction relative to said cylinder when said member is lifted against the force of gravity to an open position, and restricting the rate of movement of said piston in the opposite direction relative to said cylinder when said member is released from an open position to return to its closed position.

2. The unidirectionally cushioned hinge of claim 1 wherein said hydraulic fluid is incompressible.

3. The unidirectionally cushioned hinge of claim 1 wherein said piston is of a diameter which is less than the diameter of said cylinder, said cushion valve means comprising a flexible gasket member attached to one side of said piston and having an annular rim adapted to sealingly engage the walls of said cylinder when the piston is moving in said opposite direction relative to the cylinder, said annular rim being movable away from the walls of said cylinder by fluid passing between said piston and cylinder when said piston is moved in said one direction.

* * * * *